(12) United States Patent
Zhao

(10) Patent No.: US 10,091,816 B2
(45) Date of Patent: Oct. 2, 2018

(54) METHOD AND APPARATUS FOR TIMING MAINTENANCE UNDER COVERAGE ENHANCEMENT MECHANISM

(71) Applicant: China Academy of Telecommunications Technology, Beijing (CN)

(72) Inventor: Yali Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/033,317

(22) PCT Filed: Oct. 28, 2014

(86) PCT No.: PCT/CN2014/089668
§ 371 (c)(1),
(2) Date: Apr. 29, 2016

(87) PCT Pub. No.: WO2015/062470
PCT Pub. Date: May 7, 2015

(65) Prior Publication Data
US 2016/0278124 A1 Sep. 22, 2016

(30) Foreign Application Priority Data
Oct. 29, 2013 (CN) .......................... 2013 1 0521923

(51) Int. Cl.
*H04W 74/08* (2009.01)
*H04W 56/00* (2009.01)
(52) U.S. Cl.
CPC ......... *H04W 74/08* (2013.01); *H04W 56/004* (2013.01)

(58) Field of Classification Search
CPC ........... H04W 56/004; H04W 56/0045; H04W 72/04; H04W 74/08
See application file for complete search history.

(56) References Cited

U.S. PATENT DOCUMENTS

| 9,113,476 B2 * | 8/2015 | Peruzzi ................. H04W 74/08 |
| 2010/0142470 A1 * | 6/2010 | Park ........................ H04L 1/188 370/329 |

(Continued)

FOREIGN PATENT DOCUMENTS

| CN | 101064560 A | 10/2007 |
| CN | 101064728 A | 10/2007 |

(Continued)

OTHER PUBLICATIONS

LG Electronics, "RACH procedure for coverage enhancement of MTC UEs," 3GPP TSG RAN WG1 #74bis, Guangzhou, China, Oct. 7-11, 2013, 3 pages.

(Continued)

*Primary Examiner* — Wei Zhao
(74) *Attorney, Agent, or Firm* — Morgan Lewis & Bockius LLP

(57) ABSTRACT

Disclosed in the present application are a method and an apparatus for timing maintenance under a coverage enhancement mechanism. The method includes steps of determining a position in a time domain for the last repeated transmission over a timing-related physical channel; and determining a start time point for the timing in accordance with the determined position in the time domain. According to the present disclosure, the start time point for the timing is determined in accordance with the position in the time domain for the last repeated transmission over the timing-related physical channel.

25 Claims, 1 Drawing Sheet

(56) References Cited

U.S. PATENT DOCUMENTS

| | | | |
|---|---|---|---|
| 2012/0004002 A1 | 1/2012 | Nanri et al. | |
| 2014/0003414 A1* | 1/2014 | Choudhury | H04W 74/006 370/347 |
| 2014/0029586 A1* | 1/2014 | Loehr | H04W 56/0005 370/336 |

FOREIGN PATENT DOCUMENTS

| | | |
|---|---|---|
| CN | 101562897 A | 10/2009 |
| EP | 2 020 821 A1 | 2/2009 |
| EP | 2 869 654 A1 | 5/2015 |
| EP | 2 869 655 A1 | 5/2015 |
| WO | WO 2009/022462 A1 | 2/2009 |
| WO | WO 2010/097645 A1 | 9/2010 |
| WO | WO 2014/110805 A1 | 7/2014 |
| WO | WO 2015/066645 A1 | 5/2015 |
| WO | WO 2015/083994 A1 | 6/2015 |
| WO | WO 2015/116732 A1 | 8/2015 |
| WO | WO 2016/048044 A1 | 3/2016 |

OTHER PUBLICATIONS

NTT Docomo, "Discussion on Multi-level PRACH Coverage Enhancement," 3GPP TSG RAN WG1 Meeting #74bis, Guangzhou, China, Oct. 7-11, 2013, pp. 1-5.

Supplementary European Search Report for European Patent Application No. 14857930.3, dated Oct. 6, 2016, 12 pages.

Written Opinion for International Patent Application No. PCT/CN2014/089668, dated Jan. 28, 2015, 14 pages.

Chinese Office Action dated Sep. 22, 2017, for CN Application No. 201310521923.7, 11 pages.

LG Electronics, "RACH procedure for coverage enhancement of MTC UEs," 3GPP TSG RAN WG1 #74bis, Guangzhou, China, Oct. 7-11, 2013, 4 pages.

* cited by examiner

METHOD AND APPARATUS FOR TIMING MAINTENANCE UNDER COVERAGE ENHANCEMENT MECHANISM

CROSS-REFERENCE TO RELATED APPLICATION

The present application is a U.S. National Phase of International Application No. PCT/CN2014/089668 filed on Oct. 28, 2014, which claims priority of Chinese patent application No. 201310521923.7 filed to the SIPO on Oct. 29, 2013, and entitled "method and apparatus for timing maintenance under coverage enhancement mechanism," which are incorporated herein by reference in their entirety.

TECHNICAL FIELD

The present disclosure relates to the field of radio communication technology, in particular to a method and an apparatus for timing maintenance under a coverage enhancement mechanism.

BACKGROUND

Machine to Machine (M2M) communication is a development trend of intelligent communication in future, and a $3^{rd}$-generation (3G) mobile communication system and its Long Term Evolution (LTE) system need to support a Machine Type Communications (MTC) function. An MTC device (MTC User Equipment (UE)) may have parts of the various M2M communication features, e.g., low mobility, small volume of data to be transmitted, being insensitive to communication delay, and extremely low power consumption requirement. In an existing M2M network based on a Global System for Mobile (GSM) technology, an operator finds that, when the MTC UE operates in some scenarios, e.g., a basement, a shopping mall or a corner of a building, significant signal attenuation may occur because a radio signal is shielded seriously, and it is impossible for the MTC UE to communicate with the network. An in-depth coverage for the network in these scenarios may remarkably result in an increase in the network building cost, including cost for the newly-added equipment, cost for network planning, and cost for manual maintenance. Along with the development of the radio communication technology, an M2M service will be deployed in the LTE network, so the operator hopes that the network coverage may be effectively increased in the subsequent LTE-based radio communication technology, so as to improve the coverage for the MTC UE in the above-mentioned scenarios and for the other UEs in similar scenarios.

In order to improve the coverage for the UEs and meet the operator's demand, one possible way is to introduce a continuous transmission mechanism over a physical channel, so as to improve the coverage through a combination gain of repeated transmission. This mechanism is subsequently referred to as repetition mechanism.

For the UE which supports a coverage enhancement mechanism (i.e., the repetition mechanism), once a coverage enhancement function is enabled, it means that the data may be continuously retransmitted over some physical channels. At this time, when timing maintenance related to the physical channels is still performed in accordance with a method specified in an existing standard, the UE may not operate normally (the so-called "timing maintenance" mainly refers to the determination of a timing window or a start time point for a timer, the determination of an effective time point for any other timing information, and the like). The so-called timing maintenance related to the physical channel refers to that a start time point and an effective time point for the timing maintenance are related to the transmission over the physical channel.

Taking a random contention access procedure for an LTE-Advanced (LTE-A) system as an example, an existing random access procedure will be described hereinafter.

The UE selects a random access Preamble and a Physical Random Access Channel (PRACH) resource, and transmits a message 1 (Msg1) carrying the selected random access Preamble to a base station using the PRACH resource.

A Random Access Response Window (RAR window) is then started by the UE 3 ms after the transmission of the Msg1. A typical value for the RAR window is 10 ms.

The base station receives the random access Preamble, calculates an uplink (UL) Timing Advance (TA), and transmits to the UE an Msg2 over a Downlink Shared Channel (DL-SCH), e.g., a Physical Downlink Shared Channel (PDSCH). The Msg2 is a Random Access Response (RAR) and at least contains UL TA information and UL grant information for an Msg3.

The UE then waits in the RAR window for the reception of the RAR. When no RAR has been received, the UE may determine that the random access is failed.

Then, the UE transmits the Msg3 over an Uplink Shared Channel (UL-SCH), e.g., a Physical Uplink Shared Channel (PUSCH), so as to schedule the uplink transmission for the first time. The Msg3 carries identification information of the UE.

The UE enables a Media Access Control (MAC)-Contention Resolution Timer after the Msg3 has been transmitted, receives an Msg4 during the operation of the timer, determines whether or not the contention is successful in accordance with the identification information of the UE carried in the Msg3 as well as the Msg4, and stops the timer when the contention is successful. The Msg4 is transmitted over the DL-SCH.

For the UE under the coverage enhancement mechanism, the Msg1 is transmitted, e.g., 25 times. In accordance with the existing standard, the RAR window is started after the transmission of the Msg1 for the first time, so no RAR may be received in the RAR window. As a result, a random access failure occurs for the UE, and the system cannot operate normally.

SUMMARY

An object of the present disclosure is to provide a method and an apparatus for timing maintenance under a coverage enhancement mechanism, so as to enable the timing maintenance related to a physical channel under the coverage enhancement mechanism.

In one aspect, the present disclosure provides in some embodiments a method for timing maintenance under a coverage enhancement mechanism, including steps of: determining a position in a time domain for the last repeated transmission over a timing-related physical channel; and determining a start time point for the timing in accordance with the determined position in the time domain.

According to the method in the embodiments of the present disclosure, it is able to achieve the timing maintenance related to the physical channel under the coverage enhancement mechanism, thereby to ensure a normal operation of a system.

Some kinds of the timing will be listed and the timing maintenance will be described hereinafter.

When the timing is a RAR window during a random access procedure, a position n1 in the time domain for the last repeated transmission over a PRACH carrying a random access procedure message 1 is determined at first, and then the RAR window is started at a $(k1)^{th}$ ms after the determined position n1 in the time domain, where k1 is an integer greater than or equal to 1.

For a network-side device, a length of the RAR window is further configured for a UE, and the length of the RAR window is greater than a duration desired for the repeated transmission over a PDSCH carrying a random access procedure message 2. The length of the RAR window is a duration between a start time point and an end time point of the RAR window.

When the timing is an MAC-contention resolution timer during the random access procedure, a position n2 in the time domain for the last repeated transmission over a PUSCH carrying a random access procedure message 3 is determined at first, and then the MAC-contention resolution timer is started at the determined position n2 in the time domain.

For the network-side device, a length of the MAC-contention resolution timer is further configured for the UE, and the length of the MAC-contention resolution timer is greater than a duration desired for the repeated transmission over a PDCCH carrying a random access procedure message 4. The length of the MAC-contention resolution timer is a timing duration for the MAC-contention resolution timer.

When the timing includes a time alignment timer, a position n3 in the time domain for the last repeated transmission over a PDSCH carrying a timing advance command MAC control element is determined at first, and then the time alignment timer is started after the timing advance command MAC control element has been transmitted for the last time at the position n3 in the time domain.

When the timing further includes a timing advance carried in the timing advance command MAC control element, the timing advance is effective at a $(k2)^{th}$ subframe after a subframe corresponding to the position n3 in the time domain, where k2 is an integer greater than or equal to 1.

When granularity at the position n3 in the time domain is a subframe, the subframe corresponding to the position n3 in the time domain is the position n3 in the time domain, and the granularity at the position n3 in the time domain is less than a subframe, the subframe corresponding to the position n3 in the time domain is a subframe where the position n3 in the time domain is located.

When the timing is a scheduling request prohibiting timer, a position n4 in the time domain for the last repeated transmission over a PUCCH carrying a scheduling request is determined at first, and then the scheduling request prohibiting timer is started at a subframe corresponding to the position n4 in the time domain.

When granularity at the position n4 in the time domain is a subframe, the subframe corresponding to the position n4 in the time domain is the position n4 in the time domain, and when the granularity at the position n4 in the time domain is less than a subframe, the subframe corresponding to the position n4 in the time domain is a subframe where the position n4 in the time domain is located.

When the timing is a periodic Buffer Status Reporting timer and a Buffer Status Reporting retransmitting timer, a start time point for the timer is determined in accordance with the determined position in the time domain. To be specific, a position n5 in the time domain for the last repeated transmission over a PUSCH carrying a Buffer Status Reporting is determined at first, and then the periodic Buffer Status Reporting timer and the Buffer Status Reporting retransmitting timer are started or restarted at the position n5 in the time domain. When a truncated Buffer Status Reporting occurs, merely the Buffer Status Reporting retransmitting timer is started or restarted.

When the timing is a periodic power headroom report timer and a power headroom report prohibiting timer, a position n6 in the time domain for the last repeated transmission over a PUSCH carrying a power headroom report is determined at first, and then the periodic power headroom report timer and the power headroom report prohibiting timer are started or restarted at the position n6 in the time domain.

Alternatively, the step of determining the position in the time domain for the last repeated transmission over the timing-related physical channel includes: determining the position in the time domain for the last repeated transmission over the physical channel in accordance with a position in the time domain for the first repeated transmission over the physical channel and pre-defined retransmission times, or in accordance with the position in the time domain for the first repeated transmission over the physical channel and retransmission times configured at a network side, or in accordance with the position in the time domain for the first repeated transmission over the physical channel and a coverage enhancement level, or in accordance with the position in the time domain for the first repeated transmission over the physical channel, the coverage enhancement level and a channel type of the physical channel.

The UE further needs to notify the network side of the desired coverage enhancement level. Alternatively, a Preamble in the random access procedure message 1 is a coverage enhancement-dedicated Preamble corresponding to the coverage enhancement level. After a base station has received the coverage enhancement-dedicated Preamble, it determines that a coverage enhancement function has been enabled by the UE, and then determines the coverage enhancement level desired for the UE in accordance with a correspondence between the coverage enhancement-dedicated Preamble and the coverage enhancement level. Alternatively, the coverage enhancement level is carried in the random access procedure message 3.

Alternatively, when the timing-related physical channel is a PRACH carrying the random access procedure message, the position in the time domain for the first repeated transmission over the PRACH is configured at the network side or pre-defined; when the timing-related physical channel is a PDSCH carrying the random access procedure message 2, the position in the time domain for the first repeated transmission over the PDSCH is a $(k3)^{th}$ downlink subframe after the RAR window has been started, where k3 is an integer greater than or equal to 1; when the timing-related physical channel is a PUSCH carrying the random access procedure message 3, the position in the time domain for the first repeated transmission over the PUSCH is a first uplink subframe from a $(k4)^{th}$ ms after a subframe where the last repeated transmission over the PDSCH carrying the random access procedure message 2 occurs, where k4 is an integer greater than or equal to 1; when the timing-related physical channel is a PDSCH carrying the random access procedure message 4, the position in the time domain for the first repeated transmission over the PDSCH is a first downlink subframe from a $(k5)^{th}$ ms after a subframe where the last repeated transmission over the PUSCH carrying the random access procedure message 3 occurs, where k5 is an integer greater than or equal to 1; when a timing-related PDCCH and a PDSCH scheduled by the timing-related PDCCH are used for the transmission at an identical downlink subframe, the position in the time domain for the first repeated transmission over the PDCCH and the scheduled PDSCH is configured at the network side or pre-defined; when a timing-related PDCCH or a PDSCH scheduled by the timing-related PDCCH are not used for the transmission at an identical downlink subframe, the position in the time domain for the first repeated transmission over the PDSCH is a first downlink subframe from a $(k7)^{th}$ ms after a subframe where the last repeated transmission over the PDCCH occurs, where k7 is an integer greater than or equal to 1; when the timing-related physical channel is a PUCCH carrying scheduling requests, the position in the time domain for the first repeated transmission over the PUCCH is a position in the time domain for an available resource for the first repeated transmission of a first scheduling request after the scheduling requests have been triggered, and the available resource for the first repeated transmission of the scheduling request is configured at the network side or pre-defined; when the timing-related physical channel is a PUSCH for a PDCCH, the position in the time domain for the first repeated transmission over the PUSCH is a first uplink subframe from a $(k6)^{th}$ ms after a subframe where the last repeated transmission over the PDCCH that schedules the PDSCH occurs; and when the timing-related physical channel is a PUCCH carrying channel quality information, the position in the time domain for the first repeated transmission over the PUCCH is a first uplink subframe from a $(k8)^{th}$ ms after a subframe where the last repeated transmission over the PDSCH occurs.

In another aspect, the present disclosure further provides in some embodiments an apparatus for timing maintenance under a coverage enhancement mechanism, including: a time domain position determination module configured to determine a position in a time domain for the last repeated transmission over a timing-related physical channel; and a timing maintenance module configured to determine a start time point for the timing in accordance with the position in the time domain determined by the time domain position determination module.

According to the apparatus in the embodiments of the present disclosure, it is able to achieve the timing maintenance related to the physical channel under the coverage enhancement mechanism, thereby to ensure a normal operation of a system.

An operation mode of the timing maintenance module will be described hereinafter on the basis of the timing.

When the timing is a RAR window during a random access procedure, the timing maintenance module is configured to, after a position n1 in the time domain for the last repeated transmission over a PRACH carrying a random access procedure message 1 has been determined, determine that the RAR window is to be started at a $(k1)^{th}$ ms after the determined position n1 in the time domain, where k1 is an integer greater than or equal to 1.

For a network-side device (e.g., base station), the timing maintenance module is further configured to configure for a UE a length of the RAR window, the length of the RAR window being greater than a duration desired for the repeated transmission over a PDSCH carrying a random access procedure message 2.

When the timing is an MAC-contention resolution timer during the random access procedure, the timing maintenance module is configured to, after a position n2 in the time domain for the last repeated transmission over a PUSCH carrying a random access procedure message 3 has been determined, determine that the MAC-contention resolution timer is to be started at the determined position n2 in the time domain.

For the network-side device (e.g., base station), the timing maintenance module is further configured to configure for the UE a length of the MAC-contention resolution timer, the length of the MAC-contention resolution timer being greater than a duration desired for the repeated transmission over a PDCCH carrying a random access procedure message 4.

When the timing includes a time alignment timer, the timing maintenance module is configured to, after a position n3 in the time domain for the last repeated transmission over a PDSCH carrying a timing advance command MAC control element has been determined, determine that the time alignment timer is to be started after the timing advance command MAC control element has been transmitted for the last time at the position n3 in the time domain.

When the timing further includes a timing advance carried in the timing advance command MAC control element, the timing maintenance module is configured to determine that the timing advance is effective at a $(k2)^{th}$ subframe after a subframe corresponding to the position n3 in the time domain, where k2 is an integer greater than or equal to 1.

When the timing is a scheduling request prohibiting timer, the timing maintenance module is configured to, after a position n4 in the time domain for the last repeated transmission over a PUCCH carrying a scheduling request has been determined, determine that the scheduling request prohibiting timer is to be started at a subframe corresponding to the position n4 in the time domain.

When the timing is a periodic Buffer Status Reporting timer and a Buffer Status Reporting retransmitting timer, the timing maintenance module is configured to, after a position n5 in the time domain for the last repeated transmission over a PUSCH carrying a Buffer Status Reporting has been determined, determine that the periodic Buffer Status Reporting timer and the Buffer Status Reporting retransmitting timer are to be started or restarted at the position n5 in the time domain, or determine that merely the Buffer Status Reporting retransmitting timer is to be started or restarted at the position n5 in the time domain when a truncated Buffer Status Reporting occurs.

When the timing is a periodic power headroom report timer and a power headroom report prohibiting timer, the timing maintenance module is configured to, after a position n6 in the time domain for the last repeated transmission over a PUSCH carrying a power headroom report has been determined, determine that the periodic power headroom report timer and the power headroom report prohibiting timer are to be started or restarted at the position n6 in the time domain.

Alternatively, the time domain position determination module is configured to determine the position in the time domain for the last repeated transmission over the physical channel in accordance with a position in the time domain for the first repeated transmission over the physical channel and pre-defined retransmission times, or in accordance with the position in the time domain for the first repeated transmission over the physical channel and retransmission times configured at a network side, or in accordance with the position in the time domain for the first repeated transmission over the physical channel and a coverage enhancement level, or in accordance with the position in the time domain for the first repeated transmission over the physical channel, the coverage enhancement level and a channel type of the physical channel.

Alternatively, the coverage enhancement level is indicated by a coverage enhancement-dedicated Preamble in the random access procedure message 1 corresponding to the coverage enhancement level, or carried in the random access procedure message 3.

Alternatively, when the timing-related physical channel is a PRACH carrying the random access procedure message, the position in the time domain for the first repeated transmission over the PRACH is configured at the network side or pre-defined; when the timing-related physical channel is a PDSCH carrying the random access procedure message 2, the position in the time domain for the first repeated transmission over the PDSCH is a $(k3)^{th}$ downlink subframe after the RAR window has been started, where k3 is an integer greater than or equal to 1; when the timing-related physical channel is a PUSCH carrying the random access procedure message 3, the position in the time domain for the first repeated transmission over the PUSCH is a first uplink subframe from a $(k4)^{th}$ ms after a subframe where the last repeated transmission over the PDSCH carrying the random access procedure message 2 occurs, where k4 is an integer greater than or equal to 1; when the timing-related physical channel is a PDSCH carrying the random access procedure message 4, the position in the time domain for the first repeated transmission over the PDSCH is a first downlink subframe from a $(k5)^{th}$ ms after a subframe where the last repeated transmission over the PDSCH carrying the random access procedure message 3 occurs, where k5 is an integer greater than or equal to 1; when a timing-related PDCCH and a PDSCH scheduled by the timing-related PDCCH are used for the transmission at an identical downlink subframe, the position in the time domain for the first repeated transmission over the PDCCH and the scheduled PDSCH is configured at the network side or pre-defined; when a timing-related PDCCH or a PDSCH scheduled by the timing-related PDCCH are not used for the transmission at an identical downlink subframe, the position in the time domain for the first repeated transmission over the PDSCH is a first downlink subframe from a $(k7)^{th}$ ms after a subframe where the last repeated transmission over the PDCCH occurs, where k7 is an integer greater than or equal to 1; when the timing-related physical channel is a PUCCH carrying scheduling requests, the position in the time domain for the first repeated transmission over the PUCCH is a position in the time domain for an available resource for the first repeated transmission of a first scheduling request after the scheduling requests have been triggered, and the available resource for the first repeated transmission of the scheduling request is configured at the network side or pre-defined; when the timing-related physical channel is a PUSCH for a PDCCH, the position in the time domain for the first repeated transmission over the PUSCH is a first uplink subframe from a $(k6)^{th}$ ms after a subframe where the last repeated transmission over the PDCCH that schedules the PDSCH occurs; and when the timing-related physical channel is a PUCCH carrying channel quality information, the position in the time domain for the first repeated transmission over the PUCCH is a first uplink subframe from a $(k8)^{th}$ ms after a subframe where the last repeated transmission over the PDSCH occurs.

The apparatus in the embodiments of the present disclosure may be a UE, a device arranged in the UE, a network-side device (e.g., Node B (NB) or evolved NB (eNB)), a device arranged in the network-side device, any other physical entity or logic entity where the timing maintenance related to the physical channel needs to be performed, or a portion of the physical entity or logic entity.

In yet another aspect, the present disclosure provides in some embodiments a UE, including a processor configured to determine a position in a time domain for the last repeated transmission over a timing-related physical channel and determine a start time point for the timing in accordance with the determined position in the time domain.

According to the UE in the embodiments of the present disclosure, it is able to achieve the timing maintenance related to the physical channel under the coverage enhancement mechanism, thereby to ensure a normal operation of a system.

In still yet another aspect, the present disclosure provides in some embodiments a network-side device, including a processor configured to determine a position in a time domain for the last repeated transmission over a timing-related physical channel and determine a start time point for the timing in accordance with the determined position in the time domain.

According to the network-side device in the embodiments of the present disclosure, it is able to achieve the timing maintenance related to the physical channel under the coverage enhancement mechanism, thereby to ensure a normal operation of a system.

DETAILED DESCRIPTION OF THE EMBODIMENTS

The present disclosure provides in some embodiments a method and an apparatus for timing maintenance under a coverage enhancement mechanism. An application field and parts of the technical features of the present disclosure will be described hereinafter.

The present disclosure is applicable to a UE (e.g., an MTC UE) where a coverage enhancement function is enabled, a network-side device (e.g., eNB or NB) which supports the coverage enhancement function, or any other physical entity or logic entity where the timing maintenance related to a physical channel needs to be performed.

In the embodiments of the present disclosure, the term "timing-related physical channel" refers to that a start time point and an effective time point of the timing are related to the transmission over the physical channel.

In the embodiments of the present disclosure, the term "last repeated transmission over physical channel" refers to the last transmission when the transmission is repeated over an identical physical channel under the coverage enhance mechanism. The term "first repeated transmission over physical channel" refers to the first transmission when the transmission is repeated over an identical physical channel under the coverage enhance mechanism. Taking the repeated transmission over a PRACH carrying an Msg1 during a random access procedure as an example, when the repeated transmission times are 25, the last repeated transmission over the PRACH carrying the Msg1 refers to the $25^{th}$ transmission over the PRACH, and the first repeated transmission over the PRACH refers to the first transmission over the PRACH.

The present disclosure will be described hereinafter in conjunction with the drawings and embodiments.

Figure 1:
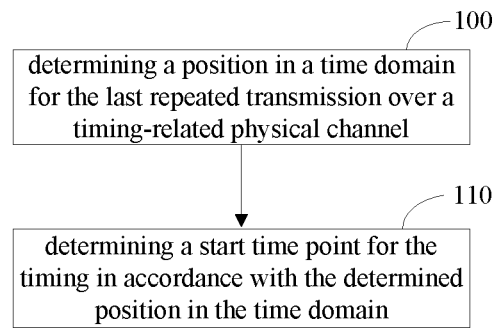
FIG. 1 is a flow chart of a method for timing maintenance under a coverage enhancement mechanism according to at least one embodiment of the present disclosure.

As shown in FIG. 1, which is a flow chart of a method for timing maintenance under a coverage enhancement mechanism according to at least one embodiment of the present disclosure, the method includes Step 100 of determining a position in a time domain for the last repeated transmission over a timing-related physical channel, and Step 110 of determining a start time point for the timing in accordance with the determined position in the time domain.

In the embodiments of the present disclosure, when the timing refers to a timing window or timer, the start time point for the timing is a start/restart time point for the timing window or timer, and when the timing refers to timing information such as timing advance, the start time point for the timing is an effective time point for the timing information.

According to the method in the embodiments of the present disclosure, it is able to achieve the timing maintenance related to the physical channel under the coverage enhancement mechanism, thereby to ensure a normal operation of a system.

The present disclosure will be described hereinafter in conjunction with the application scenarios.

Figure 2:
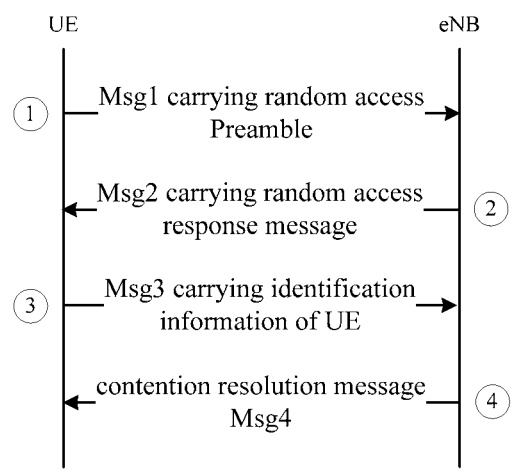
FIG. 2 is a schematic view showing a random contention access procedure.

FIG. 2 shows one kind of the timing maintenance for a coverage enhancement UE during the random access procedure.

(1) The UE repeatedly transmits an Msg1 (i.e., a random access procedure message 1) carrying a random access Preamble to an eNB.

To be specific, the UE selects the random access Preamble and a PRACH resource, and transmits the Msg1 on the PRACH resource. The selected random access Preamble is carried in the Msg1.

In order to ensure that the last repeated transmission of the Msg1 is understood by the eNB and the UE identically, the eNB may configure for the UE, and notify by, e.g., broadcasting, the UE of, a position in the time domain for the first repeated transmission of the Msg1 and repeated transmission times of the Msg1. Of course, the position in the time domain for the first repeated transmission of the Msg1 and the repeated transmission times of the Msg1 may also be pre-defined by the eNB and the UE.

A distance between the positions in the time domains for the first repeated transmission of two consecutive Msgs1 is not less than the repeated transmission times of the Msg1, and when the UE initiates the random access each time, it may transmit the Msg1 randomly at one of the positions in the time domains for the first repeated transmission of the consecutive M Msgs1.

In order to enable the eNB to determine whether or not the coverage enhancement function of the UE is enabled and the desired coverage enhancement level, one feasible way is to indicate the coverage enhance level through the Msg1, e.g., using a coverage enhancement-dedicated Preamble or PRACH, and different coverage enhancement levels are distinguished from each other by dividing the coverage enhancement-dedicated Preambles or PRACHs into different groups. In this way, once the eNB has received the Msg1, it means that the coverage enhancement needs to be performed for the UE, and subsequently the data is transmitted or received in accordance with the repeated transmission times corresponding to the coverage enhancement level.

The UE and the eNB may determine the position in the time domain for the last repeated transmission in accordance with the position in the time domain for the first repeated transmission over the PRACH carrying the Msg1 as well as the repeated transmission times. After the position in the time domain for the last repeated transmission has been determined, the UE and the eNB may determine that a RAR window is to be started at a $(k1)^{th}$ ms after the position in the time domain. The RAR window may be started at the $(k1)^{th}$ ms after the last repeated transmission over the PRACH carrying the Msg1 occurs. In the embodiments of the present disclosure, k1 may be 3.

(2) The eNB repeatedly transmits to the UE an Msg2 (i.e., random access procedure message 2). Msg2 may be a RAR which at least contains an UL grant for an Msg3 and an UL TA calculated by the eNB.

To be specific, after the eNB has received the random access Preamble, it may calculate the UL TA, and transmit the Msg2 to the UE over a PDSCH in the RAR window.

A length of the RAR window may be configured at the eNB for the UE via Radio Resource Control (RRC) signaling, and it is greater than a duration desired for the repeated transmission over the PDSCH carrying the Msg2.

The position in the time domain for the first repeated transmission over the PDSCH carrying the Msg2 may be broadcast by the eNB, or pre-defined by the eNB and the UE. For example, the eNB and the UE may agree to repeatedly transmit the PDSCH carrying the Msg2 from a $(k3)^{th}$ downlink subframe after the RAR window has been started.

The repeated transmission times over the PDSCH carrying the Msg2 may be determined in accordance with the coverage enhancement level, or in accordance with the coverage enhancement level and a physical channel type. Of course, the repeated transmission times may also be broadcast by the eNB, or pre-defined by the eNB and the UE.

(3) The UE repeatedly transmits the Msg3 (i.e., random access procedure message 3) to the eNB over a PUSCH, so as to schedule the uplink transmission for the first time. Identification information of the UE may be carried in the Msg3.

To be specific, the UE and the eNB may determine the position in the time domain for the last repeated transmission over the PUSCH carrying the Msg3 in accordance with a position in the time domain for the first repeated transmission over the PUSCH and the repeated transmission times over the PUSCH, and then determine that an MAC-ContentionResolutionTimer is to be started after the last repeated transmission of the Msg3 (alternatively, started immediately after the last repeated transmission of the Msg3). The MAC-ContentionResolutionTimer is then started after the last repeated transmission of the Msg3.

The position in the time domain for the first repeated transmission over the PUSCH carrying the Msg3 is a first uplink subframe from a $(k4)^{th}$ ms after a subframe where the repeated transmission of the Msg2 is ended.

The repeated transmission times over PUSCH carrying the Msg3 may be determined in accordance with the coverage enhancement level, or in accordance with the coverage enhancement level and the physical channel type. Of course, the repeated transmission times may also be broadcast by the eNB, or pre-defined by the eNB and the UE.

(4) The eNB repeatedly transmits to the UE a contention resolution message Msg4 (i.e., random access procedure message 4) over the PDSCH.

To be specific, after the MAC-ContentionResolution-Timer has been started by the UE, the UE may receive the Msg4 within a timing duration for the timer, and determine whether or not the contention is successful in accordance with the identification information of the UE in the Msg3 and information carried in the Msg4.

A length of the MAC-ContentionResolutionTimer is configured by the eNB, and it is greater than a duration desired for the repeated transmission of the Msg4. The length of the MAC-ContentionResolutionTimer may be transmitted by the eNB to the UE via a RRC message.

The position in the time domain for the first repeated transmission over the PDSCH carrying the Msg4 is a first downlink subframe from a $(k5)^{th}$ ms after a subframe where the repeated transmission of the Msg3 is ended.

Another kind of the timing maintenance for the coverage enhancement UE during the random access procedure will be described hereinafter.

(1) The UE repeatedly transmits the Msg1 carrying the random access Preamble to the eNB.

To be specific, the UE selects the random access Preamble and a PRACH resource, and transmits the Msg1 on the PRACH resource. The selected random access Preamble is carried in the Msg1.

In order to ensure that the last repeated transmission of the Msg1 is understood by the eNB and the UE identically, the eNB may configure for the UE, and notify by, e.g., broadcasting, the UE of, a position of the time domain for the first repeated transmission of the Msg1 and the repeated transmission times of the Msg1. Of course, the position in the time domain for the first repeated transmission of the Msg1 and the repeated transmission times of the Msg1 may also be pre-defined by the eNB and the UE.

A distance between the positions in the time domains for the first repeated transmission of two consecutive Msgs1 is not less than the repeated transmission times of the Msg1, and when the UE initiates the random access each time, it may transmit the Msg1 randomly at one of the positions in the time domains for the first repeated transmission of the consecutive M Msgs1.

The UE and the eNB may determine the position in the time domain for the last repeated transmission in accordance with the position in the time domain for the first repeated transmission over the PRACH carrying the Msg1 as well as the repeated transmission times. After the position in the time domain for the last repeated transmission has been determined, the UE and the eNB may determine that a RAR window is to be started at a $(k1)^{th}$ ms after the position of the time domain. The RAR window may be started at the $(k1)^{th}$ ms after the last repeated transmission over the PRACH carrying the Msg1 occurs. In the embodiments of the present disclosure, k1 may be 3.

(2) The eNB repeatedly transmits to the UE the Msg2. The Msg2 may be a RAR which at least contains an UL grant for an Msg3 and an UL TA calculated by the eNB.

To be specific, after the eNB has received the random access Preamble, it may calculate the UL TA, and transmit the Msg2 to the UE over a PDSCH in the RAR window.

A length of the RAR window may be configured at the eNB for the UE via RRC signaling, and it is greater than a duration desired for the repeated transmission over the PDSCH carrying the Msg2.

The position in the time domain for the first repeated transmission over the PDSCH carrying the Msg2 may be broadcast by the eNB, or pre-defined by the eNB and the UE. For example, the eNB and the UE may agree to repeatedly transmit the PDSCH carrying the Msg2 from a $(k3)^{th}$ downlink subframe after the RAR window has been started.

The repeated transmission times over the PDSCH carrying the Msg2 may be broadcast by the eNB, or pre-defined by the eNB and the UE.

(3) The UE repeatedly transmits the Msg3 to the eNB over a PUSCH, so as to schedule the uplink transmission for the first time. Identification information of the UE may be carried in the Msg3.

To be specific, the UE and the eNB may determine the position in the time domain for the last repeated transmission over the PUSCH carrying the Msg3 in accordance with a position in the time domain for the first repeated transmission over the PUSCH and the repeated transmission times over the PUSCH, and then determine that an MAC-ContentionResolutionTimer is to be started after the last repeated transmission of the Msg3 (alternatively, started immediately after the last repeated transmission of the Msg3).

The position in the time domain for the first repeated transmission over the PUSCH carrying the Msg3 is a first uplink subframe from a $(k4)^{th}$ ms after a subframe where the repeated transmission of the Msg2 is ended.

The repeated transmission times over PUSCH carrying the Msg3 may be broadcast by the eNB, or pre-defined by the eNB and the UE.

In order to enable the eNB to acquire the coverage enhancement level desired for the UE, an Information Element (IE) for indicating the coverage enhancement level desired for the UE may be added in the Msg3.

(4) The eNB repeatedly transmits to the UE a contention resolution message Msg4 over the PDSCH.

To be specific, after the MAC-ContentionResolutionTimer has been started by the UE, the UE may receive the Msg4 within a timing duration of the timer, and determine whether or not the contention is successful in accordance with the identification information of the UE in the Msg3 and information carried in the Msg4.

A length of the MAC-ContentionResolutionTimer is configured by the eNB, and it is greater than a duration desired for the repeated transmission of the Msg4. The length of the MAC-ContentionResolutionTimer may be transmitted by the eNB to the UE via a RRC message.

The position in the time domain for the first repeated transmission over the PDSCH carrying the Msg4 is a first downlink subframe from a $(k5)^{th}$ ms after a subframe where the repeated transmission of the Msg3 is ended.

Maintenance of a timeAlignmentTimer at the UE is described as follows.

The maintenance of the timeAlignmentTimer at the UE aims to ensure an identical understanding of an UL synchronous state by the UE and the eNB.

In accordance with the existing standard, once the UE has received a Timing Advance Command MAC Control Element (TAC MAC CE), it may start/restart the timeAlignmentTimer corresponding to a response timing advance set.

For the UE where the coverage enhance function is enabled, the TAC MAC CE is transmitted over the PDSCH, so it needs to be repeatedly transmitted. In order to ensure an identical understanding of a start time point of the timeAlignmentTimer by the eNB and the UE, the eNB and the UE need to agree to start/restart the timeAlignmentTimer after the last repeated transmission over the PDSCH carrying the TAC MAC CE has been completed. In addition, the eNB and the UE need to agree that a new TA indicated in the TAC MAC CE is effective at a $(k2)^{th}$ subframe after a subframe where the last repeated transmission over the PDSCH carrying the TAC MAC CE occurs.

Hence, the position in the time domain for the last repeated transmission over the PDSCH carrying the Msg2 may be determined in accordance with the position in the time domain for the first repeated transmission over the PDSCH carrying the TAC MAC CE and the repeated transmission times over the PDSCH carrying the TAC MAC CE. Then, it is able to determine, in accordance with the position in the time domain for the last repeated transmission over the PDSCH carrying the TAC MAC CE, that the new TA indicated in the TAC MAC CE is effective at the $(k2)^{th}$ subframe after a subframe where the last repeated transmission over the PDSCH carrying the TAC MAC CE occurs.

When the PDSCH carrying the TAC MAC CE and a PDCCH for scheduling the PDSCH are used for the transmission at an identical subframe, the position in the time domain for the first repeated transmission over the PDSCH and the PDCCH may be configured by the eNB (and notified to the UE by broadcasting or via dedicated signaling), or pre-defined by the eNB and the UE (in a protocol).

When the PDSCH carrying the TAC MAC CE and the PDCCH for scheduling the PDSCH are not used for the transmission at an identical subframe, the repeated transmission over the PDSCH carrying the TAC MAC CE may be started at a first downlink subframe from a $(k7)^{th}$ ms after a subframe where the last repeated transmission over the PDCCH for scheduling the PDSCH occurs.

The repeated transmission times over the PDSCH carrying the TAC MAC CE may be determined in accordance with the coverage enhancement level, or in accordance with the coverage enhancement level and the physical channel type. Of course, the repeated transmission times may also be broadcast by the eNB, or pre-defined by the eNB and the UE.

Maintenance of a Dedicated Scheduling Request (DSR)-related timer at the UE is described as follows.

In an LTE system, when the uplink data in the UE is to be transmitted but there is no uplink resource, the UE needs to use a Scheduling Request (SR) procedure to request the eNB to allocate the uplink resource, so as to subsequently perform a Buffer State Reporting (BSR) or perform the uplink transmission directly. In the LTE system, once the SR procedure has been triggered and there is a PUCCH resource available for the SR within a certain Transmission Time Interval (TTI) (the SR transmitted over the PUCCH is called as DSR), an MAC layer may notify a physical layer to transmit the DSR over the PUCCH, and an SR-Prohibit-Timer may be started, so as to prevent the frequency transmission of the DSR.

For the UE where the coverage enhancement function is enabled, once the DSR has been triggered, the SR may be repeated transmitted over the PUCCH. In order to prevent the frequent transmission of the DSR through the SR-ProhibitTimer, the SR-ProhibitTimer needs to be started during the last repeated transmission over the PUCCH carrying the SR.

In order to ensure an identical understanding of the last repeated transmission over the PUCCH carrying the DSR by the eNB and the UE, attentions need to be paid to the followings.

For the PUCCH carrying the DSR, the repeated transmission starts at a position in a time domain for a first available DSR configured by the eNB or pre-defined by the eNB and the UE.

The UE may determine the position in the time domain for the last repeated transmission over the PUCCH carrying the DSR in accordance with the position in the time domain for the first repeated transmission of the PUCCH carrying the DSR and the repeated transmission times over the PUCCH carrying the DSR. Then, the UE may determine that the SR-ProhibitTimer is to be started at a subframe whether the last repeated transmission over the PUCCH carrying the DSR in accordance with the position in the time domain for the last repeated transmission over the PUCCH carrying the DSR.

In order to ensure an identical understanding of the last repeated transmission over the PUCCH carrying the DSR by the eNB and the UE, the repeated transmission starts at a position in a time domain for a first available DSR configured by the eNB.

The repeated transmission times over the PUCCH carrying the DSR may be determined in accordance with the coverage enhancement level, or in accordance with the coverage enhancement level and a physical channel type. Of course, the repeated transmission times may also be broadcast by the eNB, or pre-defined by the eNB and the UE.

Maintenance of a BRS-related timer at the UE is described as follows.

The BSR is mainly used to report by the UE a buffer state to the eNB. For the UE where the coverage enhancement function is enabled, a regular BSR may be triggered when (1) there is data having a priority higher than the data in a current buffer or there is data arriving at a buffer that used to be empty, and (2) a BSR retransmission timer (retxBSR-Timer) has been expired and there is data in the buffer. A periodic BSR may be triggered when a periodic BSR timer (periodicBSR-Timer) has been expired. A padding BSR may be triggered when there is a padding resource other than the data to be transmitted during the creation of an MAC Protocol Data Unit (PDU) by the UE.

Once the BSR has been triggered and there is an available uplink resource, the BSR procedure may be performed by the UE.

When the RSR has been triggered and can be reported, the BSR may be reported repeatedly over the PUSCH, and the periodicBSR-Timer and the retxBSR-Timer may be started/restarted after the last repeated transmission over the PUSCH carrying the BSR. However, it should be appreciated that, when a truncated BSR occurs, the retxBSR-Timer may be started/restarted, and the periodicBSR-Timer cannot be started/restarted.

The position in the time domain for the last repeated transmission over the PUSCH carrying the BSR may be determined in accordance with the position in the time domain for the first repeated transmission over the PUSCH carrying the BSR and the repeated transmission times over the PUSCH. Then, the periodicBSR-Timer and the retxBSR-Timer (or merely the retxBSR-Timer) may be started/restarted at the position in the time domain for the last repeated transmission over the PUSCH carrying the BSR.

In order to ensure an identical understanding of the last repeated transmission over the PUSCH carrying the BSR by the eNB and the UE, the position in the time domain for the first repeated transmission is a first uplink subframe from a $(k6)^{th}$ ms after a subframe where the last repeated transmission over the PDCCH for scheduling the PUSCH carrying the BSR occurs.

The repeated transmission times over the PUSCH carrying the BSR may be determined in accordance with the coverage enhancement level, or in accordance with the coverage enhancement level and the physical channel type. Of course, the repeated transmission times may also be broadcast by the eNB, or pre-defined by the eNB and the UE.

Maintenance of a Power Headroom Reporting (PHR)-related timer at the UE is described as follows.

As defined in the LTE system, PHR is a difference between maximum transmission power allowable for the UE at a system bandwidth and estimated transmission power, and it is mainly used to facilitate the uplink scheduling by the eNB.

For the UE where the coverage enhancement function is enabled, the PHR may be triggered when (1) there is an uplink resource available for the UE, a prohibitPHR-Timer has been expired and the last path loss change reported by the PHR to the last time exceeds dl-PathlossChange dB; (2) a periodicPHR-Timer has been expired; and (3) the PHR is initially configured at a high layer or the PHR is re-configured.

A reporting procedure after the triggering of the PHR will be described hereinafter.

When there is any uplink resource available for the UE and the PHR has been triggered, in accordance with priorities of the logic channels, when the uplink resource currently allocated for the UE may contain one PHR MAC Control Element (PHR MAC CE) and an MAC sub-header corresponding to the PHR MAC CE, the UE may notify the physical layer to calculate a PH value, notify a Multiplexing and Assembly procedure to generate the PHR MAC CE, restart/restart the periodicPHR-Timer, start/restart the prohibitPHR-Timer, and then cancel out all the triggered PHRs.

In order to ensure an identical understanding of the last repeated transmission over the PUSCH carrying the PHR by the eNB and the UE, attentions may be paid to the followings.

For the repeated transmission over the PUSCH scheduled by the PDCCH, when a subframe where the repeated transmission over the PDCCH is ended is $n^{th}$ subframe, the repeated transmission over the PUSCH may be started at a first uplink subframe from a $(k6)^{th}$ ms after the $n^{th}$ subframe.

The position in the time domain for the last repeated transmission over the PUSCH carrying the PHR may be determined in accordance with the position in the time domain for the first repeated transmission over the PUSCH carrying the PHR and the repeated transmission times over the PUSCH carrying the PHR. Then, the periodicPHR-Timer and the prohibitPHR-Timer may be started/restarted at the position in the time domain for the last repeated transmission over the PUSCH carrying the PHR.

The repeated transmission times over the PUSCH carrying the PHR may be broadcast by the eNB, or pre-defined by the eNB and the UE. Of course, the repeated transmission times may also be determined in accordance with a correspondence between the coverage enhancement level and the repeated transmission times, or in accordance with a correspondence among the coverage enhancement level, the physical channel type and the repeated transmission times.

Current researches show that, the physical channels where the coverage enhancement function needs to be enabled may include PRACH, Physical Broadcast Channel (PBCH), PDSCH, PUSCH, PDCCH and PUCCH.

The timing maintenance scheme in the embodiments of the present disclosure may be applied to the above-mentioned physical channels or any other physical channels where the repeated transmission needs to be performed.

Figure 3:
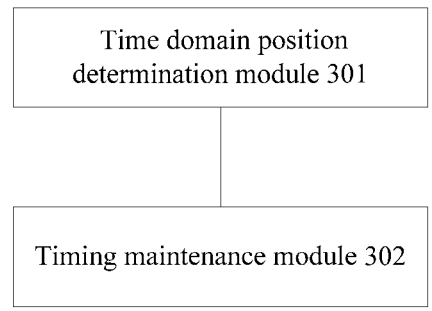
FIG. 3 is a schematic view showing an apparatus for timing maintenance under a coverage enhancement mechanism according to at least one embodiment of the present disclosure.

On the basis of an identical inventive concept, the present disclosure further provides in some embodiments an apparatus for timing maintenance under a coverage enhancement mechanism. As shown in FIG. 3, the apparatus includes a time domain position determination module 301 configured to determine a position in a time domain for the last repeated transmission over a timing-related physical channel, and a timing maintenance module 302 configured to determine a start time point for the timing in accordance with the position in the time domain determined by the time domain position determination module 301.

According to the apparatus in the embodiments of the present disclosure, it is able to achieve the timing maintenance related to the physical channel under the coverage enhancement mechanism, thereby to ensure a normal operation of a system.

An operation mode of the timing maintenance module 302 will be described hereinafter on the basis of the timing.

When the timing is a RAR window during a random access procedure, the timing maintenance module 302 is configured to, after a position n1 in the time domain for the last repeated transmission over a PRACH carrying the random access procedure message 1 has been determined, determine that the RAR window is to be started at a $(k1)^{th}$ ms after the determined position n1 in the time domain, where k1 is an integer greater than or equal to 1.

When the timing maintenance module 302 is located at a network side, it may be further configured to configure for the UE a length of the RAR window, the length of the RAR window being greater than a duration desired for the repeated transmission over a PDSCH carrying the random access procedure message 2.

When the timing is an MAC-contention resolution timer during the random access procedure, the timing maintenance module 302 is configured to, after a position n2 in the time domain for the last repeated transmission over a PUSCH carrying the random access procedure message 3 has been determined, determine that the MAC-contention resolution timer is to be started at the determined position n2 in the time domain.

When the timing maintenance module 302 is located at the network side, it may be further configured to configure for the UE a length of the MAC-contention resolution timer, the length of the MAC-contention resolution timer being greater than a duration desired for the repeated transmission over a PDCCH carrying a random access procedure message 4.

When the timing includes a time alignment timer, the timing maintenance module 302 is configured to, after a position n3 in the time domain for the last repeated transmission over a PDSCH carrying a timing advance command MAC control element has been determined, determine that the time alignment timer is to be started after the timing advance command MAC control element has been transmitted for the last time at the position n3 in the time domain.

When the timing further includes a timing advance carried in the timing advance command MAC control element, the timing maintenance module 302 is configured to determine that the timing advance is effective at a $(k2)^{th}$ subframe after a subframe corresponding to the position n3 in the time domain, where k2 is an integer greater than or equal to 1.

When the timing is a scheduling request prohibiting timer, the timing maintenance module 302 is configured to, after a position n4 in the time domain for the last repeated transmission over a PUCCH carrying a scheduling request has been determined, determine that the scheduling request prohibiting timer is to be started at a subframe corresponding to the position n4 in the time domain.

When the timing is a periodic Buffer Status Reporting timer and a Buffer Status Reporting retransmitting timer, the timing maintenance module 302 is configured to, after a position n5 in the time domain for the last repeated transmission over a PUSCH carrying a Buffer Status Reporting has been determined, determine that the periodic Buffer Status Reporting timer and the Buffer Status Reporting retransmitting timer are to be started or restarted at the position n5 in the time domain, or determine that merely the Buffer Status Reporting retransmitting timer is to be started or restarted at the position n5 in the time domain when a truncated Buffer Status Reporting occurs.

When the timing is a periodic power headroom report timer and a power headroom report prohibiting timer, the timing maintenance module 302 is configured to, after a position n6 in the time domain for the last repeated transmission over a PUSCH carrying a power headroom report has been determined, determine that the periodic power headroom report timer and the power headroom report prohibiting timer are to be started or restarted at the position n6 in the time domain.

Alternatively, the time domain position determination module 301 is configured to determine the position in the time domain for the last repeated transmission over the physical channel in accordance with a position in the time domain for the first repeated transmission over the physical channel and pre-defined retransmission times, or in accordance with the position in the time domain for the first repeated transmission over the physical channel and retransmission times configured at a network side, or in accordance with the position in the time domain for the first repeated transmission over the physical channel and a coverage enhancement level, or in accordance with the position in the time domain for the first repeated transmission over the physical channel, the coverage enhancement level and a channel type of the physical channel.

Alternatively, the coverage enhancement level is indicated by a coverage enhancement-dedicated Preamble in the random access procedure message 1 corresponding to the coverage enhancement level, or carried in the random access procedure message 3.

Alternatively, when the timing-related physical channel is a PRACH carrying the random access procedure message, the position in the time domain for the first repeated transmission over the PRACH is configured at the network side or pre-defined; when the timing-related physical channel is a PDSCH carrying the random access procedure message 2, the position in the time domain for the first repeated transmission over the PDSCH is a $(k3)^{th}$ downlink subframe after the RAR window has been started, where k3 is an integer greater than or equal to 1; when the timing-related physical channel is a PUSCH carrying the random access procedure message 3, the position in the time domain for the first repeated transmission over the PUSCH is a first uplink subframe from a $(k4)^{th}$ ms after a subframe where the last repeated transmission over the PDSCH carrying the random access procedure message 2 occurs, where k4 is an integer greater than or equal to 1; when the timing-related physical channel is a PDSCH carrying the random access procedure message 4, the position in the time domain for the first repeated transmission over the PDSCH is a first downlink subframe from a $(k5)^{th}$ ms after a subframe where the last repeated transmission over the PDSCH carrying the random access procedure message 3 occurs, where k5 is an integer greater than or equal to 1; when a timing-related PDCCH and a PDSCH scheduled by the timing-related PDCCH are used for the transmission at an identical downlink subframe, the position in the time domain for the first repeated transmission over the PDCCH and the scheduled PDSCH is configured at the network side or pre-defined; when a timing-related PDCCH and a PDSCH scheduled by the timing-related PDCCH are not used for the transmission at an identical downlink subframe, the position in the time domain for the first repeated transmission over the PDSCH is a first downlink subframe after a $(k7)^{th}$ ms after a subframe where the last repeated transmission over the PDCCH occurs, where k7 is an integer greater than or equal to 1; when the timing-related physical channel is a PUCCH carrying scheduling requests, the position in the time domain for the first repeated transmission over the PUCCH is a position in the time domain for an available resource for the first repeated transmission of a first scheduling request after the scheduling requests have been triggered, and the available resource for the first repeated transmission of the scheduling request is configured at the network side or pre-defined; when the timing-related physical channel is a PUSCH for a PDCCH, the position in the time domain for the first repeated transmission over the PUSCH is a first uplink subframe from a $(k6)^{th}$ ms after a subframe where the last repeated transmission over the PDCCH that schedules the PDSCH occurs; and when the timing-related physical channel is a PUCCH carrying channel quality information, the position in the time domain for the first repeated transmission over the PUCCH is a first uplink subframe from a $(k8)^{th}$ ms after a subframe where the last repeated transmission over the PDSCH occurs.

The apparatus may be a UE, a device arranged in the UE, a network-side device (e.g., Node B (NB) or evolved NB (eNB)), a device arranged in the network-side device, any other physical entity or logic entity where the timing maintenance related to the physical channel needs to be performed, or a portion of the physical entity or logic entity.

On the basis of an identical inventive concept, the present disclosure further provides in some embodiments a UE including a processor, which is configured to determine a position in a time domain for the last repeated transmission over a timing-related physical channel and determine a start time point for the timing in accordance with the determined position in the time domain.

An operation mode of the processor will be described hereinafter on the basis of the timing.

When the timing is a RAR window during a random access procedure, the processor is configured to, after a position n1 in the time domain for the last repeated transmission over a PRACH carrying a random access procedure message 1 has been determined, determine that the RAR window is to be started at a $(k1)^{th}$ ms after the determined position n1 in the time domain, where k1 is an integer greater than or equal to 1.

When the timing is an MAC-contention resolution timer during the random access procedure, the processor is configured to, after a position n2 in the time domain for the last repeated transmission over a PUSCH carrying a random access procedure message 3 has been determined, determine that the MAC-contention resolution timer is to be started at the determined position n2 in the time domain.

When the timing includes a time alignment timer, the processor is configured to, after a position n3 in the time domain for the last repeated transmission over a PDSCH carrying a timing advance command MAC control element has been determined, determine that the time alignment timer is to be started after the timing advance command MAC control element has been transmitted for the last time at the position n3 in the time domain.

When the timing further includes a timing advance carried in the timing advance command MAC control element, the processor is configured to determine that the timing advance is effective at a $(k2)^{th}$ subframe after a subframe corresponding to the position n3 in the time domain, where k2 is an integer greater than or equal to 1.

When the timing is a scheduling request prohibiting timer, the processor is configured to, after a position n4 in the time domain for the last repeated transmission over a PUCCH carrying a scheduling request has been determined, determine that the scheduling request prohibiting timer is to be started at a subframe corresponding to the position n4 in the time domain.

When the timing is a periodic Buffer Status Reporting timer and a Buffer Status Reporting retransmitting timer, the processor is configured to, after a position n5 in the time domain for the last repeated transmission over a PUSCH carrying a Buffer Status Reporting has been determined, determine that the periodic Buffer Status Reporting timer and the Buffer Status Reporting retransmitting timer are to be started or restarted at the position n5 in the time domain, or determine that merely the Buffer Status Reporting retransmitting timer is to be started or restarted at the position n5 in the time domain when a truncated Buffer Status Reporting occurs.

When the timing is a periodic power headroom report timer and a power headroom report prohibiting timer, the processor is configured to, after a position n6 in the time domain for the last repeated transmission over a PUSCH carrying a power headroom report has been determined, determine that the periodic power headroom report timer and the power headroom report prohibiting timer are to be started or restarted at the position n6 in the time domain.

Alternatively, the processor is configured to determine the position in the time domain for the last repeated transmission over the physical channel in accordance with a position in the time domain for the first repeated transmission over the physical channel and pre-defined retransmission times, or in accordance with the position in the time domain for the first repeated transmission over the physical channel and retransmission times configured at a network side, or in accordance with the position in the time domain for the first repeated transmission over the physical channel and a coverage enhancement level, or in accordance with the position of the time domain for the first repeated transmission over the physical channel, the coverage enhancement level and a channel type of the physical channel.

Alternatively, the coverage enhancement level is indicated by a coverage enhancement-dedicated Preamble in the random access procedure message 1 corresponding to the coverage enhancement level, or carried in the random access procedure message 3.

Alternatively, when the timing-related physical channel is a PRACH carrying the random access procedure message, the position in the time domain for the first repeated transmission over the PRACH is configured at the network side or pre-defined; when the timing-related physical channel is a PDSCH carrying the random access procedure message 2, the position in the time domain for the first repeated transmission over the PDSCH is a $(k3)^{th}$ downlink subframe after the RAR window has been started, where k3 is an integer greater than or equal to 1; when the timing-related physical channel is a PUSCH carrying the random access procedure message 3, the position in the time domain for the first repeated transmission over the PUSCH is a first uplink subframe from a $(k4)^{th}$ ms after a subframe where the last repeated transmission over the PDSCH carrying the random access procedure message 2 occurs, where k4 is an integer greater than or equal to 1; when the timing-related physical channel is a PDSCH carrying the random access procedure message 4, the position in the time domain for the first repeated transmission over the PDSCH is a first downlink subframe from a $(k5)^{th}$ ms after a subframe where the last repeated transmission over the PDSCH carrying the random access procedure message 3 occurs, where k5 is an integer greater than or equal to 1; when a timing-related PDCCH and a PDSCH scheduled by the timing-related PDCCH are used for the transmission at an identical downlink subframe, the position in the time domain for the first repeated transmission over the PDCCH and the scheduled PDSCH is configured at the network side or pre-defined; when a timing-related PDCCH and a PDSCH scheduled by the timing-related PDCCH are not used for the transmission at an identical downlink subframe, the position in the time domain for the first repeated transmission over the PDSCH is a first downlink subframe after a $(k7)^{th}$ ms after a subframe where the last repeated transmission over the PDCCH occurs, where k7 is an integer greater than or equal to 1; when the timing-related physical channel is a PUCCH carrying scheduling requests, the position in the time domain for the first repeated transmission over the PUCCH is a position in the time domain for an available resource for the first repeated transmission of a first scheduling request after the scheduling requests have been triggered, and the available resource for the first repeated transmission of the scheduling request is configured at the network side or pre-defined; when the timing-related physical channel is a PUSCH for a PDCCH, the position in the time domain for the first repeated transmission over the PUSCH is a first uplink subframe from a $(k6)^{th}$ ms after a subframe where the last repeated transmission over the PDCCH that schedules the PDSCH occurs; and when the timing-related physical channel is a PUCCH carrying channel quality information, the position in the time domain for the first repeated transmission over the PUCCH is a first uplink subframe from a $(k8)^{th}$ ms after a subframe where the last repeated transmission over the PDSCH occurs.

According to the UE in the embodiments of the present disclosure, it is able to achieve the timing maintenance related to the physical channel under the coverage enhancement mechanism, thereby to ensure a normal operation of a system.

On the basis of an identical inventive concept, the present disclosure further provides in some embodiments a network-side device including a processor, which is configured to determine a position in a time domain for the last repeated transmission over a timing-related physical channel and determine a start time point for the timing in accordance with the determined position in the time domain.

An operation mode of the processor will be described hereinafter on the basis of the timing.

When the timing is a RAR window during a random access procedure, the processor is configured to, after a position n1 in the time domain for the last repeated transmission over a PRACH carrying a random access procedure message 1 has been determined, determine that the RAR window is to be started at a $(k1)^{th}$ ms after the determined position n1 in the time domain, where k1 is an integer greater than or equal to 1.

The processor may be further configured to configure for the UE a length of a RAR window, the length of the RAR window being greater than a duration desired for the repeated transmission over the PDSCH carrying the random access procedure message 2.

When the timing is an MAC-contention resolution timer during the random access procedure, the processor is configured to, after a position n2 in the time domain for the last repeated transmission over a PUSCH carrying a random access procedure message 3 has been determined, determine that the MAC-contention resolution timer is to be started at the determined position n2 in the time domain.

The processor may be further configured to configure for the UE a length of the MAC-contention resolution timer, the length of the MAC-contention resolution timer being greater than a duration desired for the repeated transmission over the PDCCH carrying the random access procedure message 4.

When the timing includes a time alignment timer, the processor is configured to, after a position n3 in the time domain for the last repeated transmission over a PDSCH carrying a timing advance command MAC control element has been determined, determine that the time alignment timer is to be started after the timing advance command MAC control element has been transmitted for the last time at the position n3 in the time domain.

When the timing further includes a timing advance carried in the timing advance command MAC control element, the processor is configured to determine that the timing advance is effective at a $(k2)^{th}$ subframe after a subframe corresponding to the position n3 in the time domain, where k2 is an integer greater than or equal to 1.

When the timing is a scheduling request prohibiting timer, the processor is configured to, after a position n4 in the time domain for the last repeated transmission over a PUCCH carrying a scheduling request has been determined, determine that the scheduling request prohibiting timer is to be started at a subframe corresponding to the position n4 in the time domain.

When the timing is a periodic Buffer Status Reporting timer and a Buffer Status Reporting retransmitting timer, the processor is configured to, after a position n5 in the time domain for the last repeated transmission over a PUSCH carrying a Buffer Status Reporting has been determined, determine that the periodic Buffer Status Reporting timer and the Buffer Status Reporting retransmitting timer are to be started or restarted at the position n5 in the time domain, or determine that merely the Buffer Status Reporting retransmitting timer is to be started or restarted at the position n5 of the time domain when a truncated Buffer Status Reporting occurs.

When the timing is a periodic power headroom report timer and a power headroom report prohibiting timer, the processor is configured to, after a position n6 in the time domain for the last repeated transmission over a PUSCH carrying a power headroom report has been determined, determine that the periodic power headroom report timer and the power headroom report prohibiting timer are to be started or restarted at the position n6 in the time domain.

Alternatively, the processor is configured to determine the position in the time domain for the last repeated transmission over the physical channel in accordance with a position in the time domain for the first repeated transmission over the physical channel and pre-defined retransmission times, or in accordance with the position in the time domain for the first repeated transmission over the physical channel and retransmission times configured at a network side, or in accordance with the position in the time domain for the first repeated transmission over the physical channel and a coverage enhancement level, or in accordance with the position in the time domain for the first repeated transmission over the physical channel, the coverage enhancement level and a channel type of the physical channel.

Alternatively, the coverage enhancement level is indicated by a coverage enhancement-dedicated Preamble in the random access procedure message 1 corresponding to the coverage enhancement level, or carried in the random access procedure message 3.

Alternatively, when the timing-related physical channel is a PRACH carrying the random access procedure message, the position in the time domain for the first repeated transmission over the PRACH is configured at the network side or pre-defined; when the timing-related physical channel is a PDSCH carrying the random access procedure message 2, the position in the time domain for the first repeated transmission over the PDSCH is a $(k3)^{th}$ downlink subframe after the RAR window has been started, where k3 is an integer greater than or equal to 1; when the timing-related physical channel is a PUSCH carrying the random access procedure message 3, the position in the time domain for the first repeated transmission over the PUSCH is a first uplink subframe from a $(k4)^{th}$ ms after a subframe where the last repeated transmission over the PDSCH carrying the random access procedure message 2 occurs, where k4 is an integer greater than or equal to 1; when the timing-related physical channel is a PDSCH carrying the random access procedure message 4, the position in the time domain for the first repeated transmission over the PDSCH is a first downlink subframe from a $(k5)^{th}$ ms after a subframe where the last repeated transmission over the PDSCH carrying the random access procedure message 3 occurs, where k5 is an integer greater than or equal to 1; when a timing-related PDCCH and a PDSCH scheduled by the timing-related PDCCH are used for the transmission at an identical downlink subframe, the position in the time domain for the first repeated transmission over the PDCCH and the scheduled PDSCH is configured at the network side or pre-defined; when a timing-related PDCCH and a PDSCH scheduled by the timing-related PDCCH are not used for the transmission at an identical downlink subframe, the position in the time domain for the first repeated transmission over the PDSCH is a first downlink subframe after a $(k7)^{th}$ ms after a subframe where the last repeated transmission over the PDCCH occurs, where k7 is an integer greater than or equal to 1; when the timing-related physical channel is a PUCCH carrying scheduling requests, the position in the time domain for the first repeated transmission over the PUCCH is a position in the time domain for an available resource for the first repeated transmission of a first scheduling request after the scheduling requests have been triggered, and the available resource for the first repeated transmission of the scheduling request is configured at the network side or pre-defined; when the timing-related physical channel is a PUSCH for a PDCCH, the position of the time domain for the first repeated transmission over the PUSCH is a first uplink subframe from a $(k6)^{th}$ ms after a subframe where the last repeated transmission over the PDCCH that schedules the PDSCH occurs; and when the timing-related physical channel is a PUCCH carrying channel quality information, the position in the time domain for the first repeated transmission over the PUCCH is a first uplink subframe from a $(k8)^{th}$ ms after a subframe where the last repeated transmission over the PDSCH occurs.

According to the network-side device in the embodiments of the present disclosure, it is able to achieve the timing maintenance related to the physical channel under the coverage enhancement mechanism, thereby to ensure a normal operation of a system.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product executed on one or more computer-readable storage mediums (including but not limited to disk memory, Compact Disc Read-Only Memory (CD-ROM) and optical memory) including computer-readable program codes.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program instructions. These computer program instructions may be applied to a general-purpose computer, a special-purpose computer, an embedded processor or any other processor of programmable data processing equipment, so as to form a machine, thereby to obtain the device capable of implementing the functions specified in one or more processes in the flow charts and/or one or more blocks in the block diagrams in accordance with the instructions executed by the computer or the processor of the other programmable data processing equipment.

These computer program instructions may also be stored in a computer-readable memory capable of guiding the computer or the other programmable data processing equipment to work in a special manner, so as to form a product including an instruction device capable of implementing the functions specified in one or more processes in the flow charts and/or one or more blocks in the block diagrams.

These computer program instructions may also be loaded onto a computer or the other programmable data processing equipment, so as to perform a series of operations thereon and generate the processings implemented by the computer, thereby to provide the steps capable of implementing the functions specified in one or more processes in the flow charts and/or one or more blocks in the block diagrams in accordance with the instructions.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A method for timing maintenance under a coverage enhancement mechanism performed by a communication device, comprising steps of:
    determining a position in a time domain for a last one of a plurality of repeated transmissions over a physical channel related to a timing between the communication device and a corresponding communication device in communication with the communication device; and
    determining a start time point for the timing in accordance with the determined position in the time domain and a type of the timing,
    wherein the type of the timing comprises one or more of a Random Access Response RAR window during a random access procedure, a Media Access Control MAC-ContentionResolutionTimer during the random access procedure, a time alignment timer, a timing advance carried in a timing advance command MAC control element, a scheduling request prohibiting timer, a periodic Buffer Status Reporting timer, a Buffer Status Reporting retransmitting timer, a periodic power headroom report timer, and a power headroom report prohibiting timer, and different start time points are determined for different types of the timing.

2. The method according to claim 1, wherein the timing is the Random Access Response RAR window during the random access procedure, and the step of determining the start time point of the timing in accordance with the determined position in the time domain and the type of the timing, comprises, after a position n1 in the time domain for the last one of the plurality of repeated transmissions over a Physical Random Access Channel PRACH carrying a random access procedure message 1 has been determined, determining that the RAR window is started at a $(k1)^{th}$ ms after the determined position n1 in the time domain, wherein k1 is an integer greater than or equal to 1.

3. The method according to claim 2, further comprising:
    configuring a length of the RAR window for a User Equipment UE, the length of the RAR window being greater than a duration desired for the plurality of repeated transmissions over a Physical Downlink Shared Channel PDSCH carrying a random access procedure message 2.

4. The method according to claim 1, wherein the timing is the MAC-ContentionResolutionTimer during the random access procedure, and the step of determining the start time point for the timing in accordance with the determined position in time domain and the type of the timing comprises, after a position n2 in the time domain for the last one of the plurality of repeated transmissions over a Physical Uplink Shared Channel PUSCH carrying a random access procedure message 3 has been determined, determining that the MAC-ContentionResolutionTimer is started at the determined position n2 in the time domain.

5. The method according to claim 4, further comprising:
    configuring a length of the MAC-ContentionResolutionTimer for the UE, the length of the MAC-ContentionResolutionTimer being greater than a duration desired for the plurality of repeated transmissions over a Physical Downlink Control Channel PDCCH carrying a random access procedure message 4.

6. The method according to claim 1, wherein the timing comprises the time alignment timer, and the step of determining the start time point for the timing in accordance with the determined position in the time domain and the type of the timing comprises, after a position n3 in the time domain for the last one of the plurality of repeated transmissions over a Physical Downlink Shared Channel PDSCH carrying a timing advance command MAC control element has been determined, determining that the time alignment timer is started or restarted after the timing advance command MAC control element has been transmitted for a last time at the position n3 in the time domain.

7. The method according to claim 6, wherein the timing further comprises the timing advance carried in the timing advance command MAC control element, and the step of determining the start time point for the timing in accordance with the determined position in the time domain and the type of the timing comprises determining that the timing advance is effective at a $(k2)^{th}$ subframe after a subframe corresponding to the position n3 in the time domain, wherein k2 is an integer greater than or equal to 1.

8. The method according to claim 1, wherein the timing is the scheduling request prohibiting timer, and the step of determining the start time point for the timing in accordance with the determined position in the time domain and the type of the timing comprises, after a position n4 in the time domain for the last one of the plurality of repeated transmissions over a Physical Uplink Control Channel PUCCH carrying a scheduling request has been determined, determining that the scheduling request prohibiting timer is started at a subframe corresponding to the position n4 in the time domain.

9. The method according to claim 1, wherein the timing comprises the periodic Buffer Status Reporting timer and the Buffer Status Reporting retransmitting timer, and the step of determining the start time point for the timing in accordance with the determined position in the time domain and the type of the timing comprises:
after a position n5 in the time domain for the last one of the plurality of repeated transmissions over a Physical Uplink Shared Channel PUSCH carrying a Buffer Status Reporting has been determined,
determining that the periodic Buffer Status Reporting timer and the Buffer Status Reporting retransmitting timer are started or restarted at the position n5 in the time domain; or
determining that the Buffer Status Reporting retransmitting timer is started or restarted when a truncated Buffer Status Reporting occurs.

10. The method according to claim 1, wherein the timing comprises the periodic power headroom report timer and the power headroom report prohibiting timer, and the step of determining the start time point for the timing in accordance with the determined position in the time domain and the type of the timing comprises: after a position n6 in the time domain for the last one of the plurality of repeated transmissions over a Physical Uplink Shared Channel PUSCH carrying a power headroom report has been determined, determining that the periodic power headroom report timer and the power headroom report prohibiting timer are started or restarted at the position n6 in the time domain.

11. The method according to claim 1, wherein the step of determining the position in the time domain for the last one of the plurality of repeated transmissions over the timing-related physical channel between the communication device and a corresponding communication device in communication with the communication device, comprises:
determining the position in the time domain for the last one of the plurality of repeated transmissions over the physical channel in accordance with a position in the time domain for a first one of the plurality of repeated transmissions over the physical channel and pre-defined retransmission times; or
determining the position in the time domain for the last one of the plurality of repeated transmissions over the physical channel in accordance with the position in the time domain for the first one of the plurality of repeated transmissions over the physical channel and retransmission times configured at a network side; or
determining the position in the time domain for the last one of the plurality of repeated transmissions over the physical channel in accordance with the position in the time domain for the first one of the plurality of repeated transmissions over the physical channel and a coverage enhancement level; or
determining the position in the time domain for the last one of the plurality of repeated transmissions over the physical channel in accordance with the position in the time domain for the first one of the plurality of repeated transmissions over the physical channel, the coverage enhancement level and a channel type of the physical channel.

12. The method according to claim 11, wherein the coverage enhancement level is indicated by a coverage enhancement-dedicated Preamble in the random access procedure message 1 corresponding to the coverage enhancement level, or carried in the random access procedure message 3.

13. The method according to claim 11, wherein,
when the physical channel related to the timing is a Physical Random Access Channel PRACH carrying the random access procedure message, the position in the time domain for the first one of the plurality of repeated transmissions over the PRACH is configured at the network side or pre-defined;
when the physical channel related to the timing is a Physical Downlink Shared Channel PDSCH carrying the random access procedure message 2, the position in the time domain for the first one of the plurality of repeated transmissions over the PDSCH is a $(k3)^{th}$ downlink subframe after the RAR window has been started, where k3 is an integer greater than or equal to 1;
when the physical channel related to the timing is a Physical Uplink Shared Channel PUSCH carrying the random access procedure message 3, the position in the time domain for the first one of the plurality of repeated transmissions over the PUSCH is a first uplink subframe from a $(k4)^{th}$ ms after a subframe where the last one of the plurality of repeated transmissions over the PDSCH carrying the random access procedure message 2 occurs, where k4 is an integer greater than or equal to 1;
when the physical channel related to the timing is a Physical Downlink Shared Channel PDSCH carrying the random access procedure message 4, the position in the time domain for the first one of the plurality of repeated transmissions over the PDSCH is a first downlink subframe from a $(k5)^{th}$ ms after a subframe where the last one of the plurality of repeated transmissions over the PDSCH carrying the random access procedure message 3 occurs, where k5 is an integer greater than or equal to 1;
when a PDCCH related to the timing and a PDSCH scheduled by the PDCCH related to the timing are used for the transmission at an identical downlink subframe, the position in the time domain for the first one of the plurality of repeated transmissions over the PDCCH and the scheduled PDSCH is configured at the network side or pre-defined;
when a PDCCH related to the timing and a PDSCH scheduled by the PDCCH related to the timing are not used for the transmission at an identical downlink subframe, the position in the time domain for the first one of the plurality of repeated transmissions over the PDSCH is a first downlink subframe from a $(k7)^{th}$ ms after a subframe where the last one of the plurality of repeated transmissions over the PDCCH occurs, where k7 is an integer greater than or equal to 1;
when the physical channel related to the timing is a PUCCH carrying scheduling requests, the position in the time domain for the first one of the plurality of repeated transmissions over the PUCCH is a position in the time domain for an available resource for the first one of the plurality of repeated transmissions of a first scheduling request after the scheduling requests have been triggered, and the available resource for the first repeated transmission of the scheduling request is configured at the network side or pre-defined;
when the physical channel related to the timing is a PUSCH for a PDCCH, the position in the time domain for the first one of the plurality of repeated transmissions over the PUSCH is a first uplink subframe from a $(k6)^{th}$ ms after a subframe where the last one of the plurality of repeated transmissions over the PDCCH that schedules the PDSCH occurs; and when the physical channel related to the timing is a PUCCH carrying channel quality information, the position in the time domain for the first one of the plurality of repeated transmissions over the PUCCH is a first uplink subframe from a $(k8)^{th}$ ms after a subframe where the last one of the plurality of repeated transmissions over the PDSCH occurs.

14. An apparatus for timing maintenance under a coverage enhancement mechanism, comprising:

a time domain position determination circuit configured to determine a position in a time domain for a last one of the plurality of repeated transmissions over a physical channel related to a timing between a communication device and a corresponding communication device in communication with the communication device; and a timing maintenance circuit configured to determine a start time point for the timing in accordance with the position in the time domain determined by the time domain position determination circuit and a type of the timing, wherein the type of the timing comprises one or more of a Random Access Response RAR window during a random access procedure, a Media Access Control MAC-ContentionResolutionTimer during the random access procedure, a time alignment timer, a timing advance carried in a timing advance command MAC control element, a scheduling request prohibiting timer, a periodic Buffer Status Reporting timer, a Buffer Status Reporting retransmitting timer, a periodic power headroom report timer, and a power headroom report prohibiting timer, and different start time points are determined for different types of the timing by the timing maintenance circuit.

15. The apparatus according to claim 14, wherein the timing is the Random Access Response RAR window during the random access procedure, and the timing maintenance circuit is configured to, after a position n1 in the time domain for the last one of the plurality of repeated transmissions over a Physical Random Access Channel PRACH carrying a random access procedure message 1 has been determined, determine that the RAR window is to be started at a $(k1)^{th}$ ms after the determined position n1 in the time domain, wherein k1 is an integer greater than or equal to 1.

16. The apparatus according to claim 15, wherein the timing maintenance circuit is located at a network side and the timing maintenance circuit is further configured to configure for a User Equipment UE a length of the RAR window, the length of the RAR window being greater than a duration desired for the repeated transmissions over a Physical Downlink Shared Channel PDSCH carrying a random access procedure message 2.

17. The apparatus according to claim 14, wherein the timing is the Media Access Control MAC-ContentionResolutionTimer during the random access procedure, and the timing maintenance circuit is configured to, after a position n2 in the time domain for the last one of the plurality of repeated transmissions over a Physical Uplink Shared Channel PUSCH carrying a random access procedure message 3 has been determined, determine that the MAC-ContentionResolutionTimer is to be started at the determined position n2 in the time domain.

18. The apparatus according to claim 17, wherein the timing maintenance circuit is located at a network side and the timing maintenance circuit is further configured to configure for the UE a length of the MAC-ContentionResolutionTimer, the length of the MAC-ContentionResolutionTimer being greater than a duration desired for the plurality of repeated transmissions over a Physical Downlink Control Channel PDCCH carrying a random access procedure message 4.

19. The apparatus according to claim 14, wherein the timing comprises the time alignment timer, and the timing maintenance circuit is configured to, after a position n3 in the time domain for the last one of the plurality of repeated transmission over a Physical Downlink Shared Channel PDSCH carrying a timing advance command MAC control element has been determined, determine that the time alignment timer is to be started after the timing advance command MAC control element has been transmitted for a last time at the position n3 in the time domain.

20. The apparatus according to claim 19, wherein the timing further comprises the timing advance carried in the timing advance command MAC control element, and the timing maintenance circuit is configured to determine that the timing advance is effective at a $(k2)^{th}$ subframe after a subframe corresponding to the position n3 in the time domain, wherein k2 is an integer greater than or equal to 1.

21. The apparatus according to claim 14, wherein the timing is the scheduling request prohibiting timer, and the timing maintenance circuit is configured to, after a position n4 in the time domain for the last one of the plurality of repeated transmissions over a Physical Uplink Control Channel PUCCH carrying a scheduling request has been determined, determine that the scheduling request prohibiting timer is to be started at a subframe corresponding to the position n4 in the time domain.

22. The apparatus according to claim 14, wherein the timing comprises the periodic Buffer Status Reporting timer and the Buffer Status Reporting retransmitting timer, and the timing maintenance circuit is configured to, after a position n5 in the time domain for the last one of the plurality of repeated transmissions over a Physical Uplink Shared Channel PUSCH carrying a Buffer Status Reporting has been determined, determine that the periodic Buffer Status Reporting timer and the Buffer Status Reporting retransmitting timer are to be started or restarted at the position n5 in the time domain, or determine that Buffer Status Reporting retransmitting timer is to be started or restarted at the position n5 of the time domain when a truncated Buffer Status Reporting occurs.

23. The apparatus according to claim 14, wherein the timing comprises the periodic power headroom report timer and the power headroom report prohibiting timer, and the timing maintenance circuit is configured to, after a position n6 in the time domain for the last one of the plurality of repeated transmissions over a Physical Uplink Shared Channel PUSCH carrying a power headroom report has been determined, determine that the periodic power headroom report timer and the power headroom report prohibiting timer are to be started or restarted at the position n6 in the time domain.

24. The apparatus according to claim 14, wherein the time domain position determination circuit is configured to:

determine the position in the time domain for the last one of the plurality of repeated transmissions over the physical channel in accordance with a position in the time domain for a first one of the plurality of repeated transmissions over the physical channel and pre-defined retransmission times; or determine the position in the time domain for the last one of the plurality of repeated transmissions over the physical channel in accordance with the position in the time domain for the first one of the plurality of repeated transmissions over the physical channel and retransmission times configured at a network side; or determine the position in the time domain for the last one of the plurality of repeated transmissions over the physical channel in accordance with the position in the time domain for the first one of the plurality of repeated transmissions over the physical channel and a coverage enhancement level; or determine the position in the time domain for the last one of the plurality of repeated transmissions over the physical channel in accordance with the position in the time domain for the first one of the plurality of repeated transmissions over the physical channel, the coverage enhancement level and a channel type of the physical channel.

25. An apparatus for timing maintenance under a coverage enhancement mechanism, comprising:
a memory storing programs; and
a processor electrically connected to the memory and configured to execute the programs stored in the memory so as to:

determine a position in a time domain for a last one of the plurality of repeated transmissions over a physical channel related to a timing between the apparatus and a corresponding communication device in communication with the apparatus; and determine a start time point for the timing in accordance with the determined position in the time domain and a type of the timing, wherein the type of the timing comprises one or more of a Random Access Response RAR window during a random access procedure, a Media Access Control MAC-ContentionResolutionTimer during the random access procedure, a time alignment timer, a timing advance carried in a timing advance command MAC control element, a scheduling request prohibiting timer, a periodic Buffer Status Reporting timer, a Buffer Status Reporting retransmitting timer, a periodic power headroom report timer, and a power headroom report prohibiting timer, and different start time points are determined for different types of the timing.

\* \* \* \* \*